(12) United States Patent
Misawa et al.

(10) Patent No.: US 12,360,045 B2
(45) Date of Patent: Jul. 15, 2025

(54) LIGHT DETECTING DEVICE AND LIGHT DETECTING METHOD

(71) Applicant: National University Corporation Tokyo University of Agriculture and Technology, Fuchu (JP)

(72) Inventors: Kazuhiko Misawa, Fuchu (JP); Terumasa Ito, Fuchu (JP)

(73) Assignee: National University Corporation Tokyo University of Agriculture and Technology, Fuchu (JP)

( * ) Notice: Subject to any disclaimer, the term of this patent is extended or adjusted under 35 U.S.C. 154(b) by 176 days.

(21) Appl. No.: 17/908,466

(22) PCT Filed: Feb. 26, 2021

(86) PCT No.: PCT/JP2021/007554
§ 371 (c)(1),
(2) Date: Aug. 31, 2022

(87) PCT Pub. No.: WO2021/177195
PCT Pub. Date: Sep. 10, 2021

(65) Prior Publication Data
US 2023/0100591 A1 Mar. 30, 2023

(30) Foreign Application Priority Data

Mar. 2, 2020 (JP) ................. 2020-035276

(51) Int. Cl.
*G01N 21/65* (2006.01)
*G02B 27/10* (2006.01)
(Continued)

(52) U.S. Cl.
CPC ......... *G01N 21/65* (2013.01); *G02B 27/1006* (2013.01); *H01S 3/0085* (2013.01);
(Continued)

(58) Field of Classification Search
CPC ......... B60W 2556/50; B60W 2720/10; B60W 30/10; B60W 40/10; B60W 60/0015;
(Continued)

(56) References Cited

U.S. PATENT DOCUMENTS

2010/0046039 A1 2/2010 Xie et al.
2011/0122407 A1* 5/2011 Jalali ............... G01N 21/65
356/301

(Continued)

FOREIGN PATENT DOCUMENTS

JP 2010-048805 A 3/2010
JP 2013-032993 A 2/2013
(Continued)

OTHER PUBLICATIONS

Ito et al., "Invited Article: Spectral focusing with asymmetric pulses for high-contrast pump-probe stimulated Raman scattering microscopy," APL Photonics, 3 (9): 092405 (2018).
(Continued)

*Primary Examiner* — Tri T Ton
(74) *Attorney, Agent, or Firm* — Morgan, Lewis & Bockius LLP

(57) ABSTRACT

There is provided a light detecting device including: a laser light source generating light source pulse beam; a splitting section splitting the light source pulse beam into excitation beam, first probe beam and second probe beam; a first modulating section executing optical path length modulation that modulates a relative optical path length difference between the excitation beam, and the first probe beam and the second probe beam; a second modulating section phase-modulating the first probe beam; and a detecting section illuminating combined beam, in which the excitation beam, the first probe beam and the second probe beam are multi-
(Continued)

plexed, onto a sample, and detecting a stimulated Raman scattering signal that is generated.

11 Claims, 10 Drawing Sheets

(51) Int. Cl.
　　　*H01S 3/00*　　　(2006.01)
　　　*H01S 3/30*　　　(2006.01)
　　　*G01N 21/63*　　　(2006.01)
(52) U.S. Cl.
　　　CPC .............. *H01S 3/30* (2013.01); *G01N 21/636* (2013.01); *G01N 2021/655* (2013.01)
(58) Field of Classification Search
　　　CPC ............ G01C 21/3476; G01C 21/3811; G01C 21/3859; G01C 21/387; G01N 2021/655; G01N 21/636; G01N 21/65; G02B 27/1006; H01S 3/0085; H01S 3/30
　　　See application file for complete search history.

(56) References Cited

U.S. PATENT DOCUMENTS

| | | |
|---|---|---|
| 2014/0240710 A1 | 8/2014 | Shigekawa et al. |
| 2015/0177144 A1* | 6/2015 | Kinugasa ........... G01N 15/1434 |
| | | 250/459.1 |
| 2018/0149520 A1 | 5/2018 | Kohara |
| 2019/0033131 A1 | 1/2019 | Kohara |
| 2021/0218215 A1 | 7/2021 | Misawa et al. |

FOREIGN PATENT DOCUMENTS

| | | | |
|---|---|---|---|
| JP | 2018-091833 A | 6/2018 | |
| WO | 2013/161860 A1 | 10/2013 | |
| WO | WO-2019220863 A1 * | 11/2019 | .............. G01J 11/00 |

OTHER PUBLICATIONS

Extended European Search Report issued in corresponding European Patent Application No. 21765039.9 dated Apr. 26, 2023.
International Search Report issued in corresponding International Patent Application No. PCT/JP2021/007554 dated May 11, 2021.

\* cited by examiner

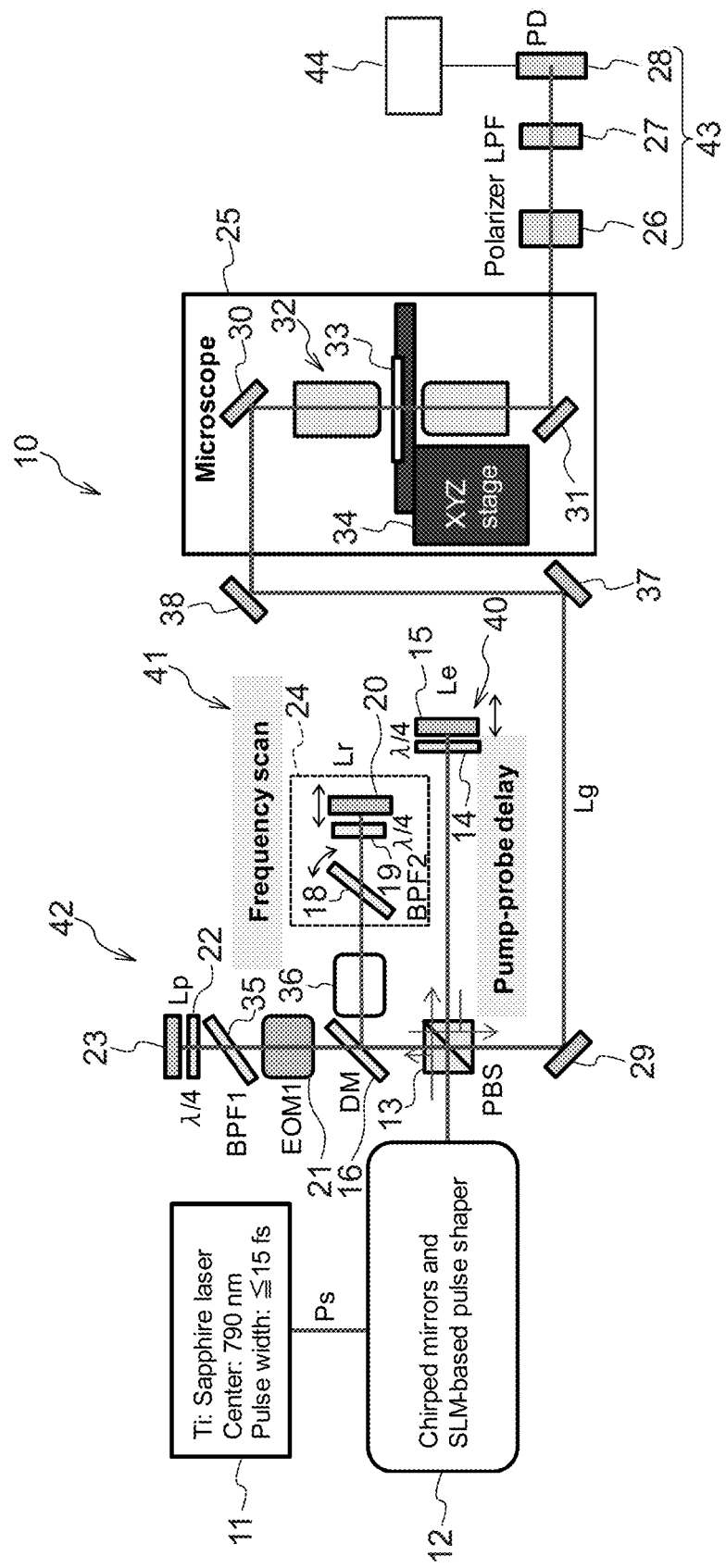

LIGHT DETECTING DEVICE AND LIGHT DETECTING METHOD

TECHNICAL FIELD

The present disclosure relates to a light detecting device and a light detecting method that detect Raman scattering.

BACKGROUND ART

A coherent Raman scattering microscope is known as a light detecting device that detects Raman scattering. A coherent Raman scattering microscope is a device that illuminates two or more pulse laser beams onto a sample, and, by observing the Raman scattered light emitted from the sample as a result thereof, analyzes substances within the sample. In particular, a time-resolved coherent Raman scattering microscope can make a signal of a small-molecule drug or the like having specific molecular vibration into a high-contrast image, without labeling and while avoiding background derived from cells and biological tissue. Such a technique is generally called Raman spectroscopy. The detecting of trace materials by Raman spectroscopy is very important as a basic technique of analytic devices, and many technological developments have been made. On the other hand, as recent medical techniques advance, the application of techniques for detecting trace materials to medical diagnostic techniques is being attempted, and even further improvement in the sensitivity of detecting trace materials is desired in this field of medical diagnostic techniques as well.

Conventionally, among coherent Raman scattering microscopes, amplitude modulation coherent Raman scattering microscopes are generally used that modulate the amplitude of the incident laser beam that is used in observation, and make the beam incident on a sample, and detect the transmitted beam or the reflected scattered beam of the incident beam at a light detector, and detect the Raman signal by demodulating that light. In this amplitude modulation coherent Raman scattering microscope, morphological information of cells and tissue can be imaged at a high speed by detecting the strong Raman signal whose molecular vibration duration is short and that is included in the organism itself that is water or lipids or the like.

The microscopic imaging system disclosed in Japanese Patent Application Laid-Open (JP-A) No. 2010-048805 for example is known as a conventional technique relating to an amplitude modulation coherent Raman scattering microscope. The microscopic imaging system relating to JP-A No. 2010-048805 is a light detecting device using stimulated Raman scattering (SRS) that is known as a coherent Raman effect. A microscopic imaging system 10 relating to JP-A No. 2010-048805 uses two laser pulse trains that are a laser pulse train 20 of central frequency $\omega_1$ that is used as the pump (excitation) beam, and a laser pulse train 16 of central frequency $\omega_2$ that is used as the Stokes beam. The Stokes beam is amplitude-modulated at a modulator, and the excitation beam and the Stokes beam are coupled at coupler 25 and thereafter illuminated onto sample 22. The transmitted beam that is transmitted through the sample 22 is sent to a photosensor 36, and, by sensing the amplitude modulation component of the sensed signal from the photosensor 36, an image based on stimulated Raman scattering is acquired.

PRIOR ART DOCUMENTS

Patent Documents

Patent Document 1: JP-A No. 2010-048805

SUMMARY OF INVENTION

Technical Problem

A problematic point of a conventional coherent Raman scattering microscope using pump beam and probe beam is the generation of a non-resonant background signal that is brought about by nonlinear four wave mixing between the pump pulse and the probe pulse. Namely, in a case in which the light pulse that excites molecular vibration and the light pulse for detecting this are superimposed in time, background (non-resonant background), which is due to the nonlinear optical effect that is unrelated to molecular vibration, is superimposed on the signal, and therefore, there is the problem that the densities of samples that can be detected are limited. For example, when detecting the coherent Raman signal of small molecules that are distributed within a biological sample, a non-resonant background signal, which arises from the water or the lipids or the like that are contained in a large amount in the organism itself, may lead to a marked deterioration in the detection limits.

In order to overcome this problem, there have conventionally been used techniques such as a method of making the polarized light of the pump pulse and the polarized light of the probe pulse orthogonal, a method of making the rise time of the probe pulse faster in a waveform shaping technique, and the like. However, the former background reducing method that uses orthogonality of the polarized lights is easily affected by the birefringence and depolarization that arise at the biological sample itself, and due thereto, the substantial detection limits are restricted.

Further, the latter method of shaping the waveform of the probe pulse focuses on the fact that the non-resonant background signal arises only at the time when the pump pulse and the probe pulse are superimposed in time, and aims to reduce the non-resonant background signal by minimizing the superimposition in time of the pump pulse and the probe pulse. However, making the superimposition in time of the pump pulse and the probe pulse small leads to a decrease in the signal intensity from the target small molecules, and therefore, there are limits to the contrast ratio of the SRS signal to the non-resonant background signal. Therefore, eliminating non-resonant background signals in accordance with new principles is desirable.

Embodiments of the present disclosure have been made in consideration of the above-described background, and an object thereof is to provide a light detecting device and a light detecting method that can effectively reduce a non-resonant background signal by a simple structure.

Solution to Problem

In order to achieve the above-described object, a light detecting device relating to a first aspect is a structure comprising: a laser light source generating light source pulse beam; a splitting section splitting the light source pulse beam into excitation beam, first probe beam and second probe beam; a first modulating section executing optical path length modulation that modulates a relative optical path length difference between the excitation beam, and the first probe beam and the second probe beam; a second modulating section phase-modulating the first probe beam; and a detecting section illuminating combined beam, in which the excitation beam, the first probe beam and the second probe beam are multiplexed, onto a sample, and detecting a stimulated Raman scattering signal that is generated.

Further, a light detecting device relating to a second aspect is a structure in which, in the light detecting device relating to the first aspect, a delay time between the first probe beam and the second probe beam is a fixed value.

Further, a light detecting device relating to a third aspect is a structure in which, in the light detecting device relating to the first aspect or the second aspect, the first modulating section executes the optical path length modulation at an integer multiple of a length corresponding to a unit wavelength of any of the excitation beam, the first probe beam and the second probe beam.

Further, a light detecting device relating to a fourth aspect is a structure in which the light detecting device relating to any aspect of the first aspect through the third aspect further comprises a mirror that reflects the excitation beam back in an optical axis direction, wherein the optical path length modulation is carried out by reciprocally moving the mirror in the optical axis direction at a predetermined amplitude.

Further, a light detecting device relating to a fifth aspect is a structure in which, in the light detecting device relating to any aspect of the first aspect through the fourth aspect, a modulation waveform of the optical path length modulation is a sawtooth-shaped waveform at which a fall time is shorter than a rise time.

Further, a light detecting device relating to a sixth aspect is a structure in which, in the light detecting device relating to any aspect of the first aspect through the fifth aspect, the detecting section detects the stimulated Raman scattering signal by lock-in detection while sampling, as a signal corresponding to a stimulated Raman scattering signal, an amplitude modulation signal by heterodyne interference with a stimulated Raman signal that appears in a wavelength of the second probe beam as a result of phase modulation of the first probe beam as a result of heterodyne interference by the first probe beam and the second probe beam, and a modulation frequency of the optical path length modulation is a frequency that is higher than a sampling frequency of the sampling.

In order to achieve the above-described object, a light detecting method relating to a seventh aspect is a light detecting method illuminating combined beam, in which excitation beam, first probe beam and second probe beam are multiplexed, onto a sample, and detecting a stimulated Raman scattering signal that is generated, the method comprising: phase-modulating the first probe beam; and modulating a relative optical path length difference between the excitation beam, and the first probe beam and the second probe beam, and detecting the stimulated Raman scattering signal.

Advantageous Effects of Invention

In accordance with embodiments of the present disclosure, there can be provided a light detecting device and a light detecting method that can effectively reduce a non-resonant background signal by a simple structure.

BRIEF DESCRIPTION OF DRAWINGS

FIG. 1 is a block drawing illustrating an example of the structure of a light detecting device relating to an embodiment.

DESCRIPTION OF EMBODIMENTS

Figure 2A:
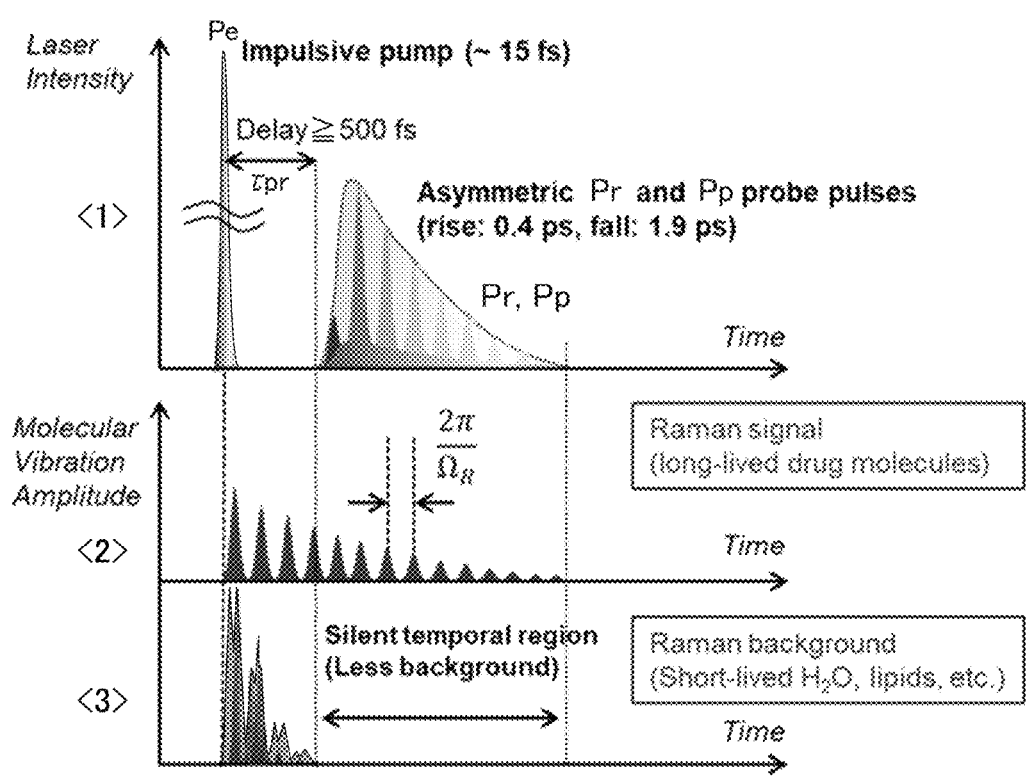
FIG. 2A is a drawing for explaining characteristics on a time axis of pulse beams at the light detecting device relating to the embodiment.

Forms for embodying the present disclosure are described in detail hereinafter with reference to the drawings. In the following explanation, description is given by using, as an example, a form in which the light detecting device and light detecting method relating to the present disclosure are applied to a light detecting device and light detecting method that use a phase modulation coherent Raman scattering microscope that uses phase modulation, as a means for sensing stimulated Raman scattering. A phase modulation coherent Raman scattering microscope divides the output of a pulse laser light source into three lights that are pump beam, phase-modulated probe beam and reference probe beam, and modulates the relative phases between the pump beam that is incident first in time, and the phase-modulated probe beam and the reference probe beam that follow thereafter and are superimposed in time. The modulation of the light intensity due to scattering between the Raman signal light generated as a result thereof and the reference probe beam is detected at a light detector and demodulated. At this phase modulation coherent Raman scattering microscope, by using the relative time difference between the pump beam and the probe beams, small molecules whose duration of molecular vibration is relatively long can be selectively detected at a high contrast. As a result, the usefulness of a coherent Raman scattering microscope that can visualize the density distribution while identifying molecular species without labeling can be markedly improved.

Referring to FIG. 1, a light detecting device 10 relating to the present embodiment is described. As illustrated in FIG. 1, the light detecting device 10 is structured to include a light source 11, a waveform shaping section 12, a PBS (Polarizing Beam Splitter) 13, an excitation pulse light adjusting section 40, a reference probe pulse light adjusting section 41, a phase-modulated probe pulse light adjusting section 42, a microscope 25, a light receiving section 43 and a control section 44.

The light source 11 is a laser light source that generates excitation beam Le and probe beams (reference probe beam Lr and phase-modulated probe beam Lp) for generating an SRS signal. In the present embodiment, pulse-shaped excitation beam (excitation pulse beam Pe) and probe beams (reference probe pulse beam Pr and phase-modulated probe pulse beam Pp) are used, and the light source 11 generates light source pulse beam Ps that is the origin of these pulse beams. Therefore, the laser beam from the light source 11 is divided into three lights that are the excitation beam Le, the reference probe beam Lr and the phase-modulated probe beam Lp. The light source pulse beam Ps and the excitation pulse beam Pe relating to the present embodiment are ultrashort pulse beams (femtosecond pulse beams). The central wavelength of the light source pulse beam Ps relating to the present embodiment is 790 nm as an example, and the pulse repetition frequency is 80 MHz as an example.

The excitation pulse light adjusting section 40 is the region that carries out adjustment of the incident excitation pulse beam Pe, the reference probe pulse beam adjusting section 41 is the region that carries out adjustment of the incident reference probe pulse beam Pr, and the phase-modulated probe pulse light adjusting section 42 is the region that carries out adjustment of the incident phase-modulated probe pulse beam Pp. The microscope 25 is the region where the excitation beam and the probe beam are illuminated onto a sample. The light receiving section 43 receives the Raman signal light generated at the sample, and the control section 44 carries out integrated control of the entire light detecting device 10. These respective regions are described in detail hereinafter.

At the light detecting device 10 relating to the present embodiment, an ultrashort pulse laser that generates the light source pulse beam Ps of a wide band is used at the light source 11. In the present embodiment, a near infrared wide-band femtosecond laser is used as an example of the light source 11. More specifically, as illustrated in FIG. 1, a titanium sapphire laser of a central wavelength of 790 nm is used as an example of the light source 11, and the pulse width is less than or equal to 15 fs (femtoseconds). However, the wavelength and pulse width of the light source 11 are not limited to these, and may be set to appropriate values in accordance with the details of the design of the light detecting device 10, or the like. Note that, in the present embodiment, the light source pulse beam Ps that is emitted from the light source 11 is linearly polarized light of a predetermined direction. However, the form of polarization of the light source pulse beam Ps is not limited to this, and may be, for example, circularly polarized light, elliptically polarized light, or the like.

The waveform shaping section 12 is the region that compensates the light source pulse beam Ps and satisfies a desired characteristic. Namely, the waveform shaping section 12 is structured to include, as an example, a dispersion compensation optical element that is not illustrated, an SLM (Spatial Light Modulator) and the like, and appropriately carries out dispersion compensation such that the pulse width of the illuminated light beneath an objective lens 32 that is described later is 15 fs as an example. Note that in the present embodiment, a chirped mirror, which provides a higher reflectivity than a dielectric multilayer film and negative second-order dispersion compensation, is used as an example of the dispersion compensation optical element, and a liquid crystal spatial light modulator is used as an example of the SLM.

The PBS 13 is an optical element that divides the laser beam generated at the light source 11 in two into the excitation beam Le and the probe beams (the reference probe beam Lr, the phase-modulated probe beam Lp).

The excitation pulse light adjusting section 40 has a λ/4 waveplate 14 and an end mirror 15. In FIG. 1, the optical path of the excitation beam Le is the light source 11→the waveform shaping section 12→the PBS 13→the ¼ waveplate 14→the end mirror 15→the ¼ waveplate 14→the PBS 13→a mirror 29. The ¼ waveplate 14 converts the excitation beam Le into circularly polarized light once, and by making the polarization direction after reflection at the end mirror 15 be a direction that is different than the polarization direction of the light source pulse beam Ps, makes the light incident on the PBS 13. The end mirror 15 is movable in the optical axis direction of the excitation beam Le, and adjusts the delay time that is provided to the excitation pulse beam Pe, and sets the time difference between the excitation pulse beam Pe and the probe pulse beam. A piezo element (not illustrated) is further mounted to the end mirror 15 relating to the present embodiment, and the end mirror 15 is structured such that minute fluctuations thereof in the optical axis direction are possible due to this piezo element. Details of these minute fluctuations are described later.

The reference probe pulse light adjusting section 41 has a dispersion compensator 36 and a wavelength scanning section 24. The wavelength scanning section 24 is structured to include a bandpass filter 18, a ¼ waveplate 19 and an end mirror 20. The optical path of the reference probe beam Lr is the light source 11→the waveform shaping section 12→the PBS 13→a bandpass filter 16 (denoted by "DM" in FIG. 1)→the dispersion compensator 36→the bandpass filter 18→the ¼ waveplate 19→the end mirror 20→the ¼ waveplate 19→the bandpass filter 18→the dispersion compensator 36→the bandpass filter 16→the PBS 13→the mirror 29.

The function of the ¼ waveplate 19 is the same as that of the ¼ waveplate 14. As illustrated in FIG. 1, the bandpass filter 18 is a tunable filter that can rotate around a predetermined rotation axis and that sets the central frequency of the reference probe pulse beam Pr. In the present embodiment, the variable range of the bandpass filter 18 is structured such that the central wavelength of the reference probe pulse beam Pr can be selected in a range of 790 nm to 870 nm as an example. The end mirror 20 mainly compensates for the fluctuations in the delay of the reference probe pulse beam Pr that accompany rotation of the bandpass filter 18. The wavelength scanning section 24 is connected to the control section 44 that is described later, and the bandpass filter 18 and the end mirror 20 are controlled by the control section 44. The dispersion compensator 36 is an optical element that provides the reference probe pulse beam Pr with dispersion corresponding to the dispersion of a light modulator 21 that is described later.

The phase-modulated probe pulse light adjusting section 42 is structured to include the light modulator 21 (denoted by "EOM1" in FIG. 1), a bandpass filter 35 (denoted by "BPF" in FIG. 1), a ¼ waveplate 22, and an end mirror 23. The optical path of the phase-modulated probe beam Lp is the light source 11→the waveform shaping section 12→the PBS 13→the bandpass filter 16→the light modulator 21→the bandpass filter 35→the ¼ waveplate 22→the end mirror 23→the ¼ waveplate 22→the bandpass filter 35→the light modulator 21→the bandpass filter 16→the PBS 13→the mirror 29. Namely, in the present embodiment, the excitation beam Le and the probe beams (the reference probe beam Lr, the phase-modulated probe beam Lp) are split by the PBS 13, and are split by the bandpass filter 16 into the reference probe beam Lr and the phase-modulated probe beam Lp.

The light modulator 21 is a phase modulator that phase-modulates the phase-modulated probe beam Lp, and, in the present embodiment, as an example, an EOM (Electro Optic Modulator) is used therefor. The light modulator 21 is connected to an unillustrated driving circuit, and this driving circuit is connected to the control section 44. In the present embodiment, the phase modulation by the light modulator 21 is carried out by, as an example, a modulation signal of a sawtooth-shaped waveform (a sawtooth wave) of 65 kHz. The bandpass filter 35 is a tunable filter that sets the central frequency of the phase-modulated probe pulse beam Pp. In the present embodiment, the wavelength of the phase-modulated probe beam Lp is 758 nm as an example. The function of the ¼ waveplate 22 is the same as that of the ¼ waveplate 14. Further, the end mirror 23 adjusts the relationship of placement in time between the reference probe pulse beam Pr and the phase-modulated probe pulse beam Pp. Note that, although the present embodiment describes, as an example, a form in which the delay is adjusted by the end mirrors 15, 20, 23, the present disclosure is not limited to this and may be a form that uses another optical element such as an optical delay line or the like for example, provided that it is a mechanism that can vary the optical delay.

Here, the reference probe pulse beam Pr and the phase-modulated probe pulse beam Pp are asymmetrical waveforms at which the rise is fast and the fall is slow, and are placed so as to be delayed by a predetermined time from the excitation pulse beam Pe (FIG. 2A). In the present embodiment, the reference probe pulse beam Pr and the phase-modulated probe pulse beam Pp are substantially the same waveforms (are waveforms that approximate one another) whose central wavelengths are different, and further, the reference probe pulse beam Pr and the phase-modulated probe pulse beam Pp are superimposed in time.

As illustrated in FIG. 1, the above-described excitation beam Le, reference probe beam Lr and phase-modulated probe beam Lp are, after being reflected back at the mirror 29, coaxially multiplexed and made into combined beam Lg, and are introduced into the microscope 25 via mirrors 37, 38. At this time, the relative delay time of the excitation pulse beam Pe and the probe pulse beams can be adjusted by the optical axis direction position of the end mirror 15 of the excitation pulse light adjusting section 40. Here, the mirrors 29, 37 and 38 are elements for converting the optical path, and are not limited to the structures illustrated in FIG. 1.

The microscope 25 is an optical microscope, and is structured to include the objective lens 32, a stage 34 and mirrors 30, 31 for reflecting back. A sample 33 is placed on the stage 34, and the combined beam Lg that is incident on the objective lens 32 is illuminated onto the sample 33. The sample 33 is, for example, biological cells into which a drug has permeated. When the combined beam Lg is illuminated onto the sample 33, an SRS signal that originates from molecular vibration of the drug molecules for example is generated on the basis of the SRS process.

The light receiving section 43 is structured to include a polarizer 26, a long-pass filter 27, and a light receiver 28.

The polarizer 26 has a polarization axis in a direction that is different than (e.g., a direction that is orthogonal to) the polarization direction of the excitation beam Le, and removes the excitation beam Le from the combined beam Lg. The long-pass filter 27 is a filter that removes the phase-modulated probe beam Lp from the combined beam Lg that includes the reference probe beam Lr and the phase-modulated probe beam Lp and from which the excitation beam Le has been removed. In the present embodiment, this is due to the wavelength of the reference probe beam Lr being set to be longer than the wavelength of the phase-modulated probe beam Lp. The light receiver 28 receives the reference probe beam Lr, and converts it into an electrical signal. A silicon photodiode for example is used as the light receiver 28. The light receiver 28 is connected to the control section 44, and the received signal at the light receiver 28 is sent to the control section 44. Note that, in the present embodiment, the long-pass filter 27 is used because, as described above, the wavelength of the reference probe beam Lr is set to be longer than the wavelength of the phase-modulated probe beam Lp. Because there are no particular limits on the relationship between the wavelength of the reference probe beam Lr and the wavelength of the phase-modulated probe beam Lp, in a case in which the wavelength of the reference probe beam Lr is set to be shorter than the wavelength of the phase-modulated probe beam Lp, it suffices to use a short-pass filter instead of the long-pass filter 27.

Namely, after passing through the microscope 25, among the laser pulses that are the excitation pulse beam Pe, the reference probe pulse beam Pr and the phase-modulated probe pulse beam Pp, the excitation pulse beam Pe is blocked at the polarizer 26 and the phase-modulated probe pulse beam Pp is blocked at the long-pass filter 27, and only the reference probe pulse beam Pr passes through to the light receiver 28. The light intensity of the reference probe pulse beam Pr is converted into current at a light detector, and the light intensity modulation component that is superimposed on the reference probe pulse beam Pr is detected at a lock-in amplifier. The light intensity modulation component detected at the lock-in amplifier is the signal component derived by Raman scattering at the sample 33, i.e., is an SRS signal. The SRS signal is a signal that is proportional to the density of the sample (a drug as an example in the present embodiment). Note that, in FIG. 1, a form in which the polarizer 26 and the long-pass filter 27 are disposed in that order is described as an example, but the order thereof may be opposite. Note that the lock-in amplifier is structured by the control section 44.

The control section 44 is the region that carries out integrated control of the light detecting device 10, and is structured to include an unillustrated CPU (Central Processing Unit), ROM (Read Only Memory), RAM (Random Access Memory) and the like. The control section 44 further carries out light detecting processing that extracts the frequency component of the SRS light from the reference probe beam Lr that includes the SRS light generated at the sample 33. Moreover, the control section 44 executes non-resonant background signal reducing processing relating to the present embodiment that is described later.

Moreover, the control section 44 is connected to the driving circuit (including a signal generator, not illustrated) of the light modulator 21, the light receiver 28, the wavelength scanning section 24 and the like. There are also cases in which a signal generator, which generates an electrical signal for carrying out phase modulation by changing the driving voltage of the light modulator 21, and a high-voltage amplifier are provided within the control section 44 or are attached to the exterior thereof. In this case, the control section 44 controls this signal generator, and carries out waveform control of the driving voltage for modulating the light modulator 21, and the like. The control section 44 can be structured by using a general personal computer or the like.

The control section 44 drives the light modulator 21 via the driving circuit, and receives an amplitude modulation signal from the light receiver 28 and structures the lock-in amplifier, and extracts the SRS signal from the reference probe pulse beam Pr that has been amplitude-modulated by heterodyne interference. More specifically, the amplitude modulation signal, which has been applied to the reference probe pulse beam Pr as a result of the heterodyne interference by the reference probe beam Lr and the phase-modulated probe beam Lp, is lock-in detected as a signal corresponding to the SRS signal.

The wavelength scanning section 24 is further connected to the control section 44, and the control section 44 controls the rotation of the bandpass filter 18 included in the wavelength scanning section 24, and the movement of the end mirror 20. Further, the control section 44 is connected to the piezo element that is mounted to the end mirror 15, and drives this piezo element and causes the end mirror 15 to fluctuate minutely in the optical axis direction.

As described above, in the light detecting device and light detecting method relating to the present embodiment, the response of the substance (the instantaneous change in the refractive index) that is generated by the molecular vibrations excited by the excitation beam Le is converted into intensity modulation of the time-delayed probe beam, and the light intensity modulation component that has been made synchronous with the modulation frequency is detected by using a demodulator such as a lock-in amplifier or the like.

Figure 2B:
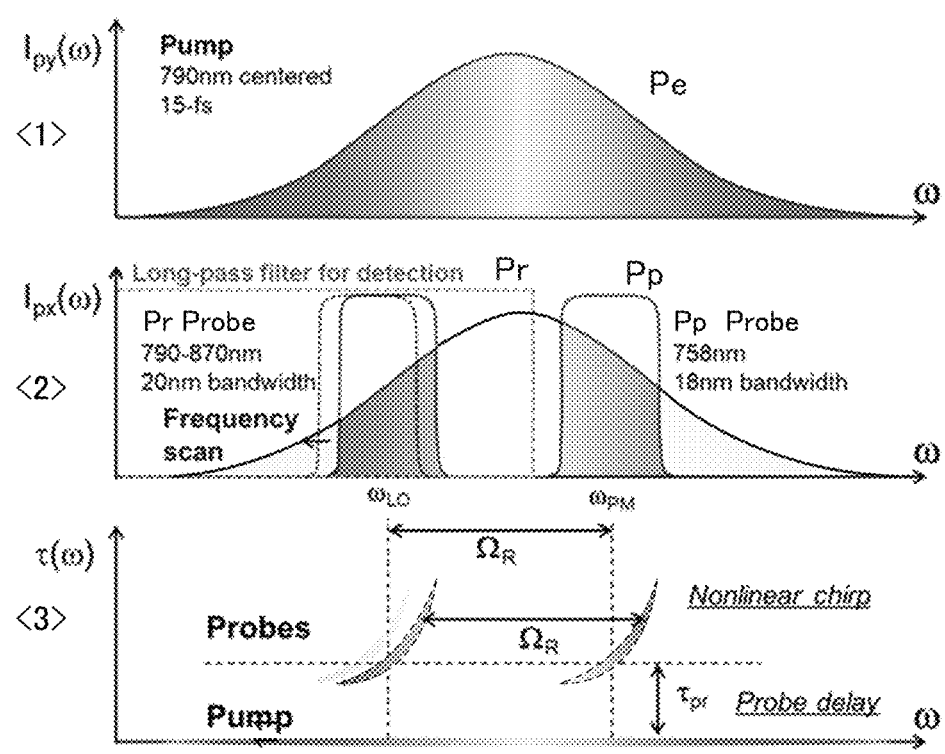
FIG. 2B is a drawing for explaining characteristics on a frequency axis of the pulse beams at the light detecting device relating to the embodiment.

The method of reducing the non-resonant background signal in the light detecting device and light detecting method relating to the present embodiment is described next with reference to FIG. 2A through FIG. 2B, and FIG. 3A through FIG. 3D. FIG. 2A is a drawing for explaining characteristics on the time axis of the pulse beams at the light detecting device 10, and FIG. 2B is a drawing for explaining characteristics on the frequency axis. FIG. 3A through FIG. 3D are drawings illustrating the principles of non-resonant background signal reduction at the light detecting device 10.

At the light detecting device 10, the non-resonant background signal is reduced by modulating the relative delay between the excitation beam and the probe beams at an amplitude of about the time corresponding to the wavelength of the light. To this end, at the light detecting device 10, the end mirror 15 is driven by the piezo element mounted to the end mirror 15, and the optical path length of the excitation beam Le is varied periodically. This modulation is carried out by a sawtooth wave of a frequency of around 300 Hz for example. The modulation amplitude of the optical path length is set to, for example, the amount of movement corresponding to the delay of one wavelength of the phase-modulated probe beam Lp (as an example, a wavelength of 758 nm).

Here, the present embodiment describes, as an example, a form in which the position of the end mirror 15 in the optical axis direction is varied periodically, and the optical path length of the excitation beam Le is varied. However, because it suffices for the relative optical path length (the delay time) between the excitation beam Le and the probe pulse beams to vary, the optical path length at the excitation beam Le side may be fixed, and the optical path length at the probe beams side may be varied. Hereinafter, varying the relative optical path length between the excitation beam Le and the probe beams is called "optical path length modulation". Note that, although the present embodiment describes a piezo element as an example of the mechanism that carries out the optical path length modulation, the mechanism is not limited to this, and, for example, may be the form of a mirror holding mechanism in which a stepping mirror is installed, or may be the form of a mechanism that drives plural light polarizing elements (Galvano mirrors) in cooperation with one another. Further, the modulation waveform of the optical path length modulation is not limited to a sawtooth wave, and, because it suffices for it to be a periodic wave, may be a sine wave for example. However, because a sawtooth wave can be structured such that the phase difference at discontinuous points is $2\pi$, using a sawtooth wave is preferable from this standpoint. Further, although the present embodiment describes, as an example, a form in which the modulation frequency of the optical path length modulation is around 300 Hz, it is more preferable for the modulation frequency to be greater than or equal to several kHz. However, it is preferable for the modulation frequency of the optical path length modulation to be less than or equal to the modulation frequency of the phase modulation by the light modulator 21.

FIG. 2A illustrates the relationships between the time waveforms of the respective pulses and molecular vibration amplitude. FIG. 2A<1> illustrates the time relationships of the excitation pulse beam Pe and the reference probe pulse beam Pr, the phase-modulated probe pulse beam Pp, i.e., the incident timings. As illustrated in FIG. 2A<1>, the reference probe pulse beam Pr and the phase-modulated probe pulse beam Pp are superimposed in time, and are delayed by delay time $\tau_{pr}$ from the excitation pulse beam Pe. Namely, in the present embodiment, plural molecular vibrations are excited by the excitation beam Le of a short pulse width, and this vibration is heterodyne detected by using two probe beams. Note that, in the present embodiment, the delay time $\tau_{pr}$ is 500 fs as an example. However, the delay time $\tau_{pr}$ is not limited to 500 fs, and may be set appropriately in accordance with the object of detection and the like.

Here, in FIG. 2A<1>, for convenience, the excitation pulse beam Pe and the probe pulse beams are drawn so as to be sufficiently apart in time, but, in actuality, the bases of the excitation pulse beam Pe and the respective probe pulse beams trail along, and a non-resonant background signal is generated in this region where the bases overlap.

Note that, at the reference probe pulse beam Pr and the phase-modulated probe pulse beam Pp illustrated in FIG. 2A<1>, the respective envelopes thereof show the reference probe pulse beam Pr and the phase-modulated probe pulse beam Pp. On the other hand, the pulse-shaped waveform shown at the interior of the envelope schematically shows the bead signal that is due to the frequency difference between the reference probe pulse beam Pr and the phase-modulated probe pulse beam Pp. As illustrated in FIG. 2A<1>, the present embodiment uses a waveform that is asymmetrical in time as the reference probe pulse beam Pr and the phase-modulated probe pulse beam Pp, and the rise time of the reference probe pulse beam Pr and the phase-modulated probe pulse beam Pp is 0.4 ps as an example, and the fall time is 1.9 ps as an example.

On the other hand, FIG. 2A<2> and <3> illustrate the molecular vibration amplitude. FIG. 2A<2> illustrates the molecular vibration of the sample (in the present embodiment, a drug is used as an example), and FIG. 2A<3> illustrates background molecular vibration. As illustrated in FIG. 2A<2>, the vibration of the sample is vibration of a relatively long life that starts from the position of the excitation pulse beam Pe and continues substantially to the position of the end of the probe pulse beams. In contrast, as illustrated in FIG. 2A<3>, the background molecular vibration has a short life as compared with the molecular vibration of the sample, and substantially disappears in a vicinity of the rise position of the probe pulse beams. In other words, the delay time $\tau_{pr}$ of the excitation pulse beam Pe and the probe pulse beams is set such that the probe pulse beams rise around the time when the background molecular vibration subsides.

Next, the frequency (wavelength) characteristics of the excitation pulse beam Pe, the reference probe pulse beam Pr and the phase-modulated probe pulse beam Pp are described with reference to FIG. 2B. FIG. 2B<1> illustrates the light output frequency characteristic of the excitation pulse beam Pe, <2> illustrates the light output frequency characteristics of the reference probe pulse beam Pr and the phase-modulated probe pulse beam Pp, and <3> illustrates the group delay frequency characteristic of the reference probe pulse beam Pr and the phase-modulated probe pulse beam Pp. Note that the scales of the horizontal axes (angular frequency ω) in FIG. 2B<1>~<3> match.

As illustrated in FIG. 2B<1>, because the present embodiment uses ultrashort pulse beam as the excitation pulse beam Pe, the excitation pulse beam Pe has a wide bandwidth. As described above, the central wavelength of the excitation pulse beam Pe is around 790 nm, and the pulse width is around 15 fs.

In contrast, due to a portion of the band characteristic of the excitation pulse beam Pe being cut-out due to the reference probe pulse beam Pr by the bandpass filter 18 and the phase-modulated probe pulse beam Pp by the bandpass filter 16, the light output frequency characteristics of the reference probe pulse beam Pr and the phase-modulated probe pulse beam Pp have band limits as illustrated in FIG. 2B<2>. The central wavelength of the reference probe pulse beam Pr relating to the present embodiment is 790 nm~870 nm as an example, and the bandwidth is around 20 nm. The central wavelength of the phase-modulated probe pulse beam Pp is around 758 nm as an example, and the bandwidth is around 18 nm. Namely, in the present embodiment, the bandwidth of the reference probe pulse beam Pr and the bandwidth of the phase-modulated probe pulse beam Pp are set so as to be substantially equal. Here, the difference between 790 nm~870 nm, which is the central wavelength range of the reference probe pulse beam Pr, and the central wavelength 758 nm of the phase-modulated probe pulse beam Pp is the wavelength scanning range, and corresponds to the range of detection of molecular vibration of the sample. In other words, the light detecting device 10 relating to the present embodiment has a wavelength scanning (spectral scanning) range of 80 nm. Of course, the central wavelengths of the reference probe pulse beam Pr and the phase-modulated probe pulse beam Pp, and the wavelength scanning range, are examples, and may be set to appropriate values in accordance with the design conditions of the light detecting device 10 and the like. Note that, as described above, scanning of the central wavelength of the reference probe pulse beam Pr is carried out by rotation of the bandpass filter 18.

On the other hand, as illustrated in FIG. 2B<3>, the fixed delay time $\tau_{pr}$ with the excitation pulse beam Pe is commonly provided to the delay frequency characteristics of the reference probe pulse beam Pr and the phase-modulated probe pulse beam Pp. Moreover, in the present embodiment, nonlinear chirp due to passage through the respective bandpass filters 18, 16 is applied to the reference probe pulse beam Pr and the phase-modulated probe pulse beam Pp, respectively. In the present embodiment, the shape of the nonlinear chirp of the reference probe pulse beam Pr and the shape of the nonlinear chirp of the phase-modulated probe pulse beam Pp are set so as to be substantially the same shapes.

Here, as described above, the central frequency of the reference probe pulse beam Pr and the central frequency of the phase-modulated probe pulse beam Pp are different. Hereinafter, the difference between the central frequency of the reference probe pulse beam Pr and the central frequency of the phase-modulated probe pulse beam Pp is called "frequency difference nit.".

Due to the above-described structure, the reference probe pulse beam Pr and the phase-modulated probe pulse beam Pp respectively are asymmetrical waveforms that extend in time, as illustrated in FIG. 2A<1>. When chirp of substantially equal amounts is provided to pulses of substantially equal bandwidths, the difference frequency of the asymmetrical pulses that extend in time are a constant frequency regardless of the time. This difference frequency is equal to the difference of the central frequencies of the probe beams, i.e., the frequency difference $\Omega_R$. Of the molecular vibrations that are excited by the excitation beam Le, only the vibration component that coincides with this constant frequency difference $\Omega_R$ is converted into light intensity modulation of the probe beams.

Namely, when the three pulse laser beams that are the excitation pulse beam Pe, the reference probe pulse beam Pr and the phase-modulated probe pulse beam Pp are illuminated onto the sample 33, first, plural molecular vibrations are simultaneously excited by the excitation pulse beam Pe, and thereafter, transfer of energy between the probe beams is carried out in the stimulated Raman scattering process by the reference probe pulse beam Pr and the phase-modulated probe pulse beam Pp. At this time, the phase modulation that is applied to the phase-modulated probe pulse beam Pp is converted into light intensity modulation of the reference probe pulse beam Pr (and the phase-modulated probe pulse beam Pp). The detected frequency is determined by the frequency difference $\Omega_R$ between the reference probe pulse beam Pr and the phase-modulated probe pulse beam Pp. On the other hand, because the frequency resolution is determined by the reciprocal of the pulse width, the ability to discriminate the molecules is improved more by a pulse beam to which chirp is applied more strongly.

The principles of the nonlinear background signal reduction at the light detecting device 10 are described next. The following description focuses on the difference in the output responses with respect to the relative delay time $\tau_{pr}$ of the excitation pulse beam Pe and the probe pulse beams. Note that the delay of the excitation pulse beam Pe is 0.

First, electric field $E_{pump}$ of the excitation pulse beam Pe is expressed by following (formula 1), electric field $E_{PM}$ of the phase-modulated probe pulse beam Pp is expressed by following (formula 2), and electric field $E_{LO}$ of the reference probe pulse beam Pr is expressed by following (formula 3). Here, in (formula 1) through (formula 3), ω represents the frequency, and ϕ represents the phase. Note that, in the following description, symbols that are in italics in the formulas are written as symbols that are not in italics.

$$E_{pump} = |E_{pump}| \exp\{i\omega_{pump} t + \phi_{pump}\} \quad \text{(formula 1)}$$

$$E_{PM} = |E_{PM}| \exp\{i\omega_{PM}(t - \tau_{pr}) + \phi_{PM}\} \quad \text{(formula 2)}$$

$$E_{LO} = |E_{LO}| \exp\{i\omega_{LO}(t - \tau_{pr}) + \phi_{LO}\} \quad \text{(formula 3)}$$

At this time, at $\tau_{pr} \gg t$, non-resonant background signal $A_{NR}$ is expressed by following (formula 4).

$$A_{NR} \propto \Delta n_{NR} E_{pump} E_{PM}{}^x = \chi_{NR}{}^{(3)}$$
$$|E_{pump}|^3 |E_{PM}| \exp\{i\omega_{PM}\tau_{pr} + (\phi_{pump} - \phi_{PM})\} \quad \text{(formula 4)}$$

wherein $$\Delta n_{NR} = \chi_{NR}{}^{(3)} |E_{pump}|^2 \quad \text{(formula 5)}$$

Here, $X^{(3)}$ expresses third-order nonlinear susceptibility.

As shown by (formula 4), the product of frequency $\omega_{PM}$ and the delay time $\tau_{pr}$ remains in the phase term of the non-resonant background signal $A_{NR}$. Because the response time of the light detector is slow, the dependency of t is time-averaged and does not appear in the formula.

On the other hand, coherent Raman signal $A_{sig}$ is expressed by following (formula 6).

$$A_{sig} \propto \Delta n_{Raman} \varepsilon_{PM} \varepsilon_{LO} = \chi_{Raman}^{(3)} |\varepsilon_{pump}|^2 |E_{PM}||E_{LO}| \exp\{i(\omega_{PM}-\omega_{LO})\tau_{pr} + (\phi_{PM}-\phi_{LO})\}$$ (formula 6)

wherein $$\Delta n_{Raman} = \chi_{Raman}^{(3)} |E_{pump}|^2 \sin(\Omega_R t)$$ (formula 7)

$\Omega_R = \omega_{PM} - \omega_{LO}$

As shown by (formula 6), the product of the difference frequency $(\omega_{PM}-\omega_{LO})$ of the probe beams and the delay time $\tau_{pr}$ remains in the phase term of the coherent Raman signal $A_{sig}$.

From the above, it can be understood that the sensitivity of the phase of the output signal with respect to a change in the delay time $\tau_{pr}$ is $\omega_{PM}$ in the case of the non-resonant background signal $A_{NR}$, and is $(\omega_{PM}-\omega_{LO})$ in the case of the coherent Raman signal $A_{sig}$. Here, focusing on the fact that wpm is a value that is sufficiently large as compared with $(\omega_{PM}-\omega_{LO})$, for example, is a value that is one digit larger, by taking the moving average that shifts by, for example, one wavelength of the probe pulse beams on the delay time $(\tau_{pr})$ axis, the non-resonant background signal $A_{NR}$ component can be greatly reduced while a decrease in the intensity of the coherent Raman signal $A_{sig}$ is suppressed.

Namely, by taking the moving average that shifts by one wavelength of the probe pulse beams on the delay time axis, the non-resonant background signal $A_{NR}$ that is dependent on $\omega_{PM}\tau_{pr}$ fluctuates within the entire range of $\omega_{PM}\tau_{pr} = \pm\pi$ (i.e., as a value, the range of ±1), and if the average is taken over the modulation cycle, smoothing is carried out, and the non-resonant background signal $A_{NR}$ can be cancelled to zero level. On the other hand, the coherent Raman signal $A_{sig}$ that is the target fluctuates in the range of around $(\omega_{PM}-\omega_{LO})_{pr} = \pm\pi/10$, and the fluctuations in the signal intensity due to the optical path length modulation are minute. Accordingly, the coherent Raman signal $A_{sig}$ in a case in which optical path length modulation is carried out is a magnitude that does not differ greatly from the coherent Raman signal $A_{sig}$ in a case in which optical path length modulation is not carried out.

The above-described principles of non-resonant background signal reduction are described in further detail with reference to FIG. 3A through FIG. 3D.

Figure 3A:
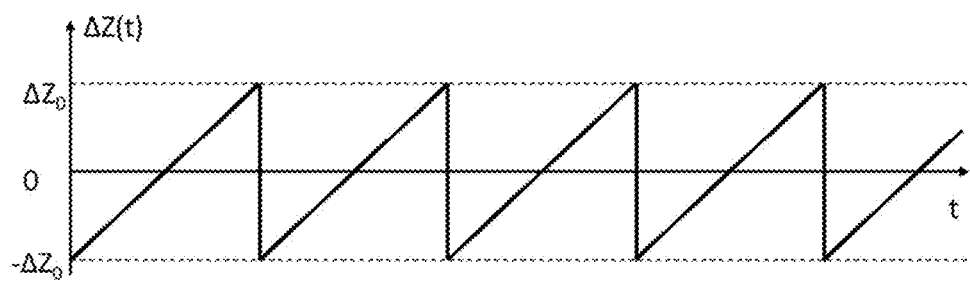
FIG. 3A is a drawing illustrating a modulation waveform of optical path length modulation at the light detecting device relating to the embodiment.

FIG. 3A illustrates modulation waveform $\Delta Z(t)$ of the optical path length modulation. Namely. FIG. 3A illustrates the changes in position $Z(t)$ of the end mirror 15 (the reflect-back mirror of the excitation beam Le) due to driving of the piezo element. As illustrated in FIG. 3A, at the light detecting device 10, optical path length modulation is carried out by using a modulation waveform that is a sawtooth wave and whose fall time is shorter than its rise time. In the present embodiment, modulation frequency $f_Z$ of the optical path length modulation is around 300 Hz, but is not limited to this, and may be a frequency that is greater than or equal to several kHz. However, it is preferable that the frequency $f_Z$ of the optical path length modulation is less than or equal to the modulation frequency of the phase modulation by the light modulator 21. Note that the modulation waveform of the optical path length modulation is not limited to a sawtooth wave, and may be a sine wave for example.

Here, the relationship between relative delay change amount $\Delta\tau_{pr}$, which is the amount of change in the delay time $\tau_{pr}$, and displacement $\Delta Z$ of the end mirror 15 is expressed by following (formula 8).

$$\Delta\tau_{pr} = 2\Delta Z/c$$ (formula 8)

wherein c is the velocity of light.

At this time, it is thought to carry out optical path length modulation (i.e., modulation of the optical path length of the excitation beam Le) such that the phase term of the non-resonant background signal $A_{NR}$ becomes an integer multiple of $2\pi$. At this time, when using (formula 8), following (formula 9) is established for $\omega_{PM}\Delta\tau_{pr}$.

$$\omega_{PM}\Delta\tau_{pr} = 2\pi c/\lambda_{PM} \cdot 2\Delta Z/c = 2\pi n$$ (formula 9)

wherein the "·" symbol denotes multiplication, $\lambda_{PM}$ is the wavelength of the phase-modulated probe beam Lp, and n is an integer.

From (formula 9), if optical path length modulation is carried out such that following (formula 10) is satisfied, and the time average is taken, the non-resonant background signal $A_{NR}$ can be cancelled.

$$2\Delta Z = n\lambda_{PM}$$ (formula 10)

The reason why generation of the non-resonant background signal $A_{NR}$ is suppressed by using the waveforms of the coherent Raman signal $A_{sig}$ and the non-resonant background signal $A_{NR}$ in a case in which optical path length modulation is carried out, is described with reference to FIG. 3B through FIG. 3D. In these drawings, optical path length modulation is carried out with the entire modulation width of the optical path length modulation being an integer multiple (in the drawing, n=1 for easy for understanding) of the half-wave length of the phase-modulated probe beam Lp. Note that the wavelength of the light that is used as the standard for the optical path length modulation is preferably the wavelength of the phase-modulated probe pulse beam Pp because $\omega_{PM}\Delta\tau_{pr}$ is cancelled.

Figure 3B:
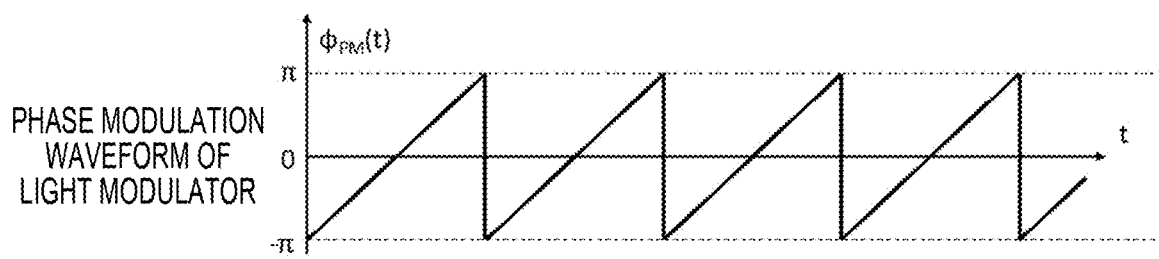
FIG. 3B is a drawing illustrating a phase modulation waveform of a light modulator at the light detecting device relating to the embodiment.

FIG. 3B illustrates phase modulation waveform $\phi_{PM}(t)$ of the light modulator 21. As illustrated in FIG. 3B, in the present embodiment, the phase modulation waveform $\phi_{PM}(t)$ is a sawtooth wave whose frequency $f_{PM}$ is around 100 kHz. Note that, although a sawtooth wave whose fall time is faster than the rise time is illustrated in FIG. 3B, conversely, the phase modulation waveform may be a sawtooth wave whose rise time is faster than the fall time (e.g., a waveform that has line symmetry with respect to the waveform illustrated in FIG. 3B).

Figure 3C:
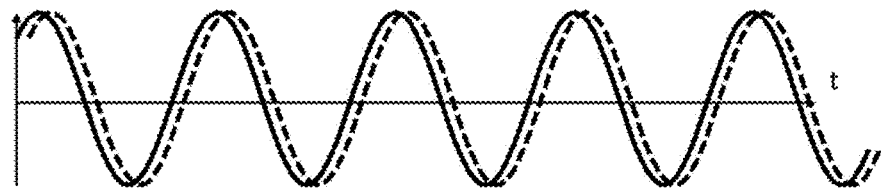
FIG. 3C is a drawing illustrating light intensity fluctuations of a coherent Raman signal at the light detecting device relating to the embodiment.

FIG. 3C illustrates the light intensity fluctuations of the coherent Raman signal $A_{sig}$. As illustrated in FIG. 3C, the waveform of the coherent Raman signal $A_{sig}$ moves back and forth between the solid line and the dashed line due to the optical path length modulation. Phase difference $\Delta\phi_{Raman}$ between the solid line and the dashed line is proportional to molecular vibration frequency $\Omega_{Raman}$. Namely, following (formula 11) is established.

$$\Delta\phi_{Raman} = (\Omega_{Raman}\Delta\tau_{pr})/2 < \pi$$ (formula 11)

Namely, it can be understood that, although the phase of the waveform of the coherent Raman signal $A_{sig}$ shifts slightly due to the optical path length modulation of the excitation beam Le, it hardly varies at all.

Figure 3D:
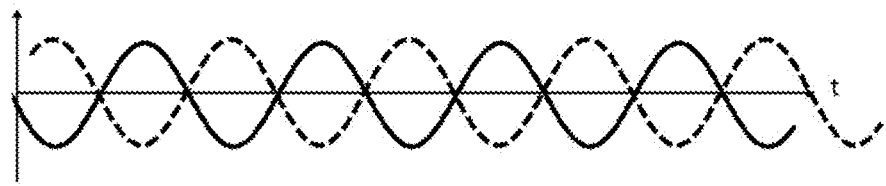
FIG. 3D is a drawing illustrating light intensity fluctuations of a non-resonant background signal at the light detecting device relating to the embodiment.

FIG. 3D illustrates light intensity fluctuations of the non-resonant background signal $A_{NR}$. As illustrated in FIG.

3D, the waveform of the non-resonant background signal $A_{NR}$ moves back and forth between the solid line and the dashed line due to the optical path length modulation. Phase difference $\Delta\phi_{NR}$ between the solid line and the dashed line is proportional to the frequency $\omega_{PM}$ of the phase-modulated probe beam Lp. Namely, following (formula 12) is established.

$$\Delta\phi_{NR}=(\omega_{PM}\Delta\tau_{pr})/2=\pi \qquad \text{(formula 12)}$$

Namely, the phase of the waveform of the non-resonant background signal $A_{NR}$ inverts due to the optical path length modulation of the excitation beam Le, and is cancelled.

Figure 4:
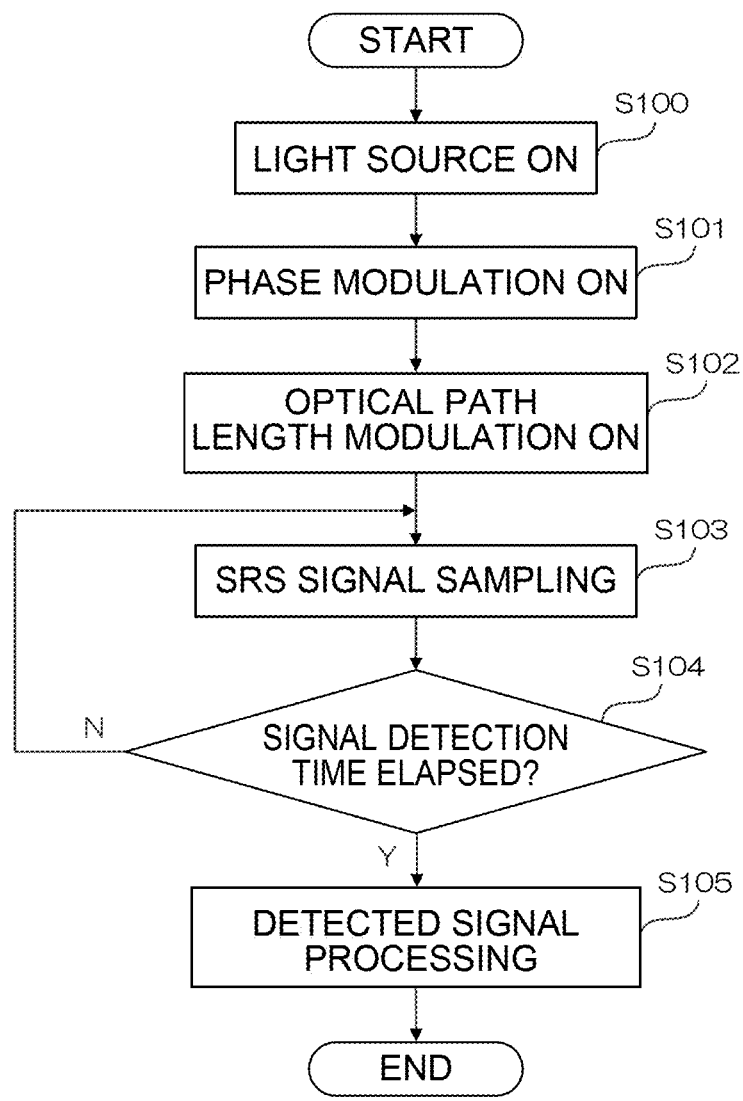
FIG. 4 is a flowchart illustrating the flow of non-resonant background signal reducing processing that is executed at the light detecting device relating to the embodiment.

Next, the non-resonant background signal reducing processing, which is executed by the control section 44 of the light detecting device 10, is described with reference to FIG. 4. FIG. 4 is a flowchart illustrating the flow of the processing of a non-resonant background signal reducing processing program. This non-resonant background signal reducing processing program is stored in an unillustrated storage device such as a ROM or the like. The CPU reads-out the program from the ROM or the like, and expands and executes the program in a RAM or the like.

In step S100, the power of the light source 11 is turned on, and the light source 11 is turned on.

In step S101, a driving circuit (not illustrated) of the light modulator 21 is operated, and phase modulation by the light modulator 21 is turned on.

In step S102, a driving circuit (not illustrated) of the piezo element that is mounted to the end mirror 15 is operated, and optical path length modulation is turned on. Note that the present embodiment describes, as an example, a form in which the phase modulation and the optical path length modulation are turned on in that order, but the order may be the opposite.

In step S103, sampling of the coherent Raman signal (SRS signal) that is based on lock-in detection is carried out.

In step S104, it is judged whether a signal detection time has elapsed (whether sampling at all of the sampling points has been completed). If this judgement is a negative judgement, the routine returns to step S103, and sampling is continued. On the other hand, in the case of an affirmative judgement, the routine moves on to step S105.

In step S105, signal processing is carried out by using the detection signals that have been sampled until then, and the spectrum of the coherent Raman signal $A_{sig}$ is computed. Thereafter, the present non-resonant background signal reducing processing program is ended.

Here, the relationship between sampling frequency $f_{sam}$ of the signal detection by the lock-in amplifier (i.e., the reciprocal of the signal integration time per one sampling), frequency $f_{PM}$ of the phase modulation by the light modulator 21, and frequency $f_Z$ of the optical path length modulation is described. The following two cases are assumed in the method of setting these frequencies.

$$f_{sam}>f_Z \qquad \text{<Case 1>}$$

$$f_Z>f_{sam} \qquad \text{<Case 2>}$$

In Case 1, because the optical path length modulation component of the non-resonant background signal is superimposed on the signal output, after acquiring the signal, the time-series output signal is Fourier-transformed, and filtering that removes the optical path length modulation frequency component is carried out. On the other hand, in Case 2, because smoothing of the non-resonant background signal is carried out within the integration time of the lock-in amplifier, it suffices to detect the signal output as is. In the light detecting device 10, frequency setting of either case may be used, but setting in accordance with Case 2 is preferable from the standpoint of simplifying the signal processing.

Figure 5A:
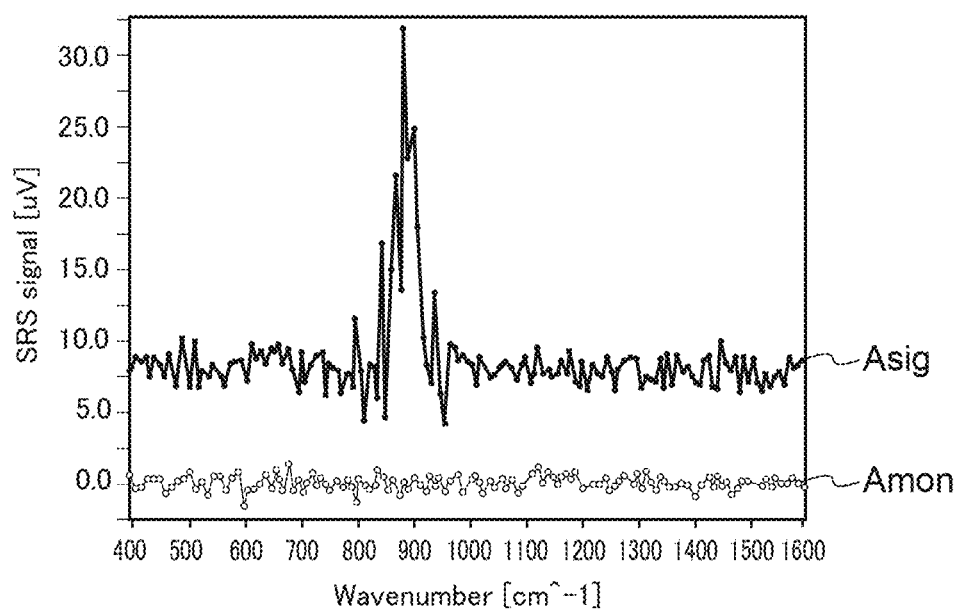
FIG. 5A is a drawing illustrating the spectra of a coherent Raman signal and monitor output in a case in which optical path length modulation is not executed.
Figure 5B:
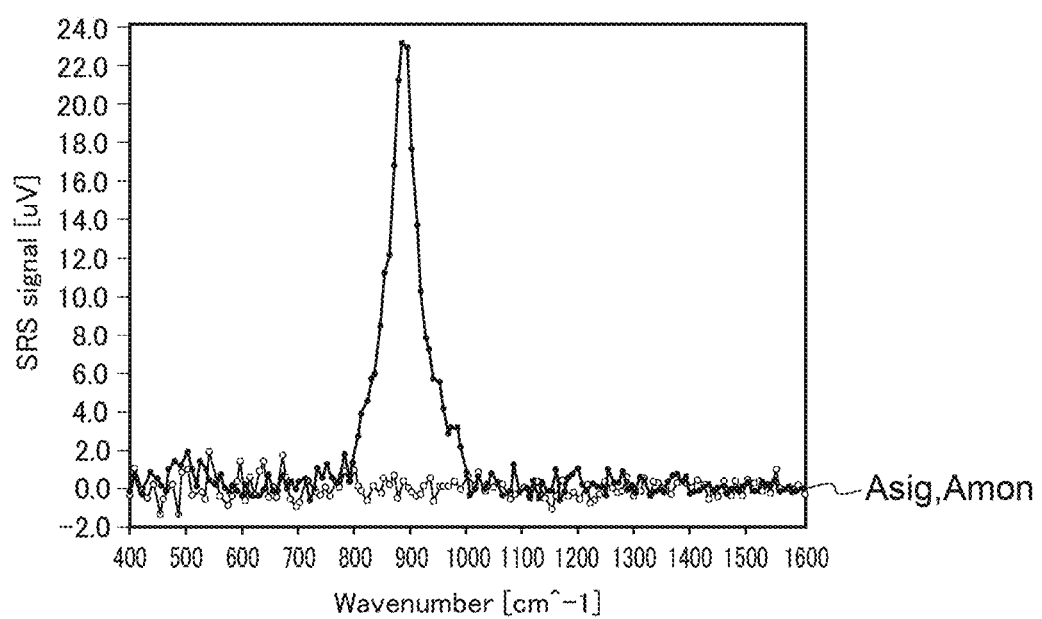
FIG. 5B is a drawing illustrating the spectra of a coherent Raman signal and monitor output in a case in which optical path length modulation is executed.

An Example of the light detecting device and light detecting method relating to the present embodiment is described next with reference to FIG. 5A and FIG. 5B. FIG. 5A illustrates the spectra of the coherent Raman signal $A_{sig}$ (the SRS signal) and the monitor output in a case in which optical path length modulation is not executed, and FIG. 5B illustrates the spectra of the coherent Raman signal $A_{sig}$ (the SRS signal) and the monitor output in a case in which optical path length modulation is executed. In both cases, phase modulation by the light modulator 21 is carried out. Note that the monitor output is output for noise measurement of the light source laser, and is a baseline determined by the noise of the light source 11.

The conditions of implementing the present Example are as follows.
  sample: acetic acid (Raman peak: 893 cm$^{-1}$)
  phase modulation
modulation waveform: sawtooth wave, modulation frequency: 65 kHz
  optical path length modulation
modulation waveform: sine wave, modulation frequency: 300 Hz, modulation amplitude: length corresponding to the delay of one wavelength of the phase-modulated probe beam Lp (In actuality, the spectral interference between the excitation beam Le and the phase-modulated probe beam Lp is monitored, and the optimal value of the amplitude of the piezo element input voltage is set.)
  lock-in amplifier
integration time: 300 ms, sampling frequency: 3.3 Hz
  delay time $\tau_{pr}$: 1.2 ps In FIG. 5A and FIG. 5B, the peak of the coherent Raman signal $A_{sig}$ corresponds to the Raman peak (893 cm$^{-1}$) of acetic acid. In the case of no optical path length modulation that is illustrated in FIG. 5A, the baseline floats uniformly around 8 µV because of the non-resonant background signal $A_{NR}$. Because the coherent Raman signal $A_{sig}$ whose amplitude is around 24 µV is superimposed on this baseline, a deterioration in the ratio of the SRS signal to the background signal is seen. On the other hand, in the case in which there is optical path modulation that is illustrated in FIG. 5B, floating of the baseline that is caused by the non-resonant background signal $A_{NR}$ is almost completely eliminated. As a result, it can be understood that, even if the coherent Raman signal $A_{sig}$ is the same approximately 24 µV, the ratio of the SRS signal to the background signal markedly improves.

As described in detail above, the light detecting device and light detecting method relating to the present embodiment have a structure in which, in addition to phase modulation, the relative time difference (delay) between the excitation pulse beam and the detection pulse beams (probe pulse beams) is repeatedly varied by the time corresponding to the optical path length of one wavelength of the light (or an integer multiple thereof). Due to this modulating of the delay time (modulating of the optical path length), only the complex amplitude of the non-resonant background signal is selectively smoothed and can be made to approach zero, substantially without damping the signal of the molecular vibration (the coherent Raman signal). As a result, the molecular density can be quantified to a lower density. Namely, effects of the non-resonant background signal, which include the effects of the birefringence of the sample, are reduced, and, for example, detection of a low-density drug of less than an mM (millimolar), which has conventionally been extremely difficult, is possible.

Note that, although the above embodiment describes, as an example, a form that uses the one excitation pulse beam Pe, the present disclosure is not limited to this and may be a form that utilizes plural excitation pulse beams Pe. If plural excitation pulse beams Pe are used, the excitation power with respect to the sample can gradually be made to be high.

The disclosure of Japanese Patent Application No. 2020-035276 that was filed on Mar. 2, 2020 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 light detecting device
11 light source
12 waveform shaping section
13 PBS
14 ¼ waveplate
15 end mirror
16 bandpass filter
18 bandpass filter
19 ¼ waveplate
20 end mirror
21 light modulator
22 ¼ waveplate
23 end mirror
24 wavelength scanning section
25 microscope
26 polarizer
27 long-pass filter
28 light receiver
29, 30, 31 mirror
32 objective lens
33 sample
34 stage
35 bandpass filter
36 dispersion compensator
37, 38 mirror
40 excitation pulse light adjusting section
41 reference probe pulse light adjusting section
42 phase-modulated probe pulse light adjusting section
43 light receiving section
44 control section
Le excitation beam
Lr reference probe beam
Lp phase-modulated probe beam
Lg combined beam
Pr reference probe pulse beam
Pp phase-modulated probe pulse beam
Ps light source pulse beam
Pe excitation pulse beam
Pp phase-modulated probe pulse beam
Pr reference probe pulse beam
$\tau_{pr}$ delay time
$\Omega_R$ frequency difference

The invention claimed is:

1. A light detecting device comprising:
a laser light source generating light source pulse beam;
Polarizing Beam Splitter (PBS) and bandpass filter splitting the light source pulse beam into excitation beam, phase-modulated probe beam Lp and reference probe beam Lr;
an excitation pulse light adjusting section executing optical path length modulation that modulates a relative optical path length difference between the excitation beam and at least one of the phase-modulated probe beam Lp and the reference probe beam Lr;
a light modulator phase-modulating the phase-modulated probe beam Lp;
a mirror that reflects the excitation beam back in an optical axis direction, wherein the optical path length modulation is carried out by reciprocally moving the mirror 15 in the optical axis direction at a predetermined amplitude corresponding to 758 nm in a sawtooth wave of a frequency of 300 Hz, and
a detecting section illuminating combined beam, in which the excitation beam, the phase-modulated probe beam Lp and the reference probe beam Lr are combined, onto a sample, and detecting a Raman Signal $A_{sig}$ that is generated,
wherein a delay time between the phase-modulated probe beam Lp and the reference probe beam Lr is a fixed value, and
wherein the excitation pulse light adjusting section executes the optical path length modulation at an optical path length difference that corresponds to an integer multiple of a length corresponding to a unit wavelength of the phase-modulated probe beam Lp or the reference probe beam Lr.

2. The light detecting device of claim 1, wherein the sawtooth wave has a sawtooth-shaped waveform at which a fall time is shorter than a rise time.

3. The light detecting device of claim 1, wherein:
the detecting section detects the Raman Signal $A_{sig}$ by lock-in detection while sampling, as a signal corresponding to the Raman Signal $A_{sig}$, an amplitude modulation signal by heterodyne interference with a result of phase modulation of the phase-modulated probe beam Lp and the Raman Signal $A_{sig}$ that appears in a wavelength of the reference probe beam Lr as a result of heterodyne interference by the phase-modulated probe beam Lp and the reference probe beam Lr, and
a modulation frequency of the optical path length modulation is a frequency that is higher than a sampling frequency of the sampling.

4. The light detecting device of claim 1, comprising:
a tunable filter configured to set a central frequency of the phase-modulated probe beam Lp.

5. The light detecting device of claim 1, comprising:
one or more additional mirrors configured to combine the excitation beam, the phase-modulated probe beam Lp and the reference probe beam Lr and convert an optical path.

6. A light detecting method illuminating combined beam, in which excitation beam, phase-modulated probe beam Lp and reference probe beam Lr are combined, onto a sample, and detecting a Raman Signal $A_{sig}$ that is generated, the method comprising:
phase-modulating the phase-modulated probe beam Lp;
reflecting the excitation beam back in an optical axis direction, wherein the optical path length modulation is carried out by reciprocally moving a mirror in the optical axis direction at a predetermined amplitude corresponding to 758 nm in a sawtooth wave of a frequency of 300 Hz; and modulating a relative optical path length difference between the excitation beam, and at least one of the phase-modulated probe beam Lp and the reference probe beam Lr, and detecting the Raman Signal $A_{sig}$, wherein a delay time between the phase-modulated probe beam Lp and the reference probe beam Lr is a fixed value, and wherein, in modulating the optical path length difference, the optical path length modulation is carried out at an optical path length difference that corresponds to an integer multiple of a length corresponding to a unit wavelength of the phase-modulated probe beam Lp or the reference probe beam Lr.

7. The light detecting method of claim 6, wherein:

the detecting detects the Raman Signal $A_{sig}$ by lock-in detection while sampling, as a signal corresponding to the Raman Signal $A_{sig}$, an amplitude modulation signal by heterodyne interference with a result of phase modulation of the phase-modulated probe beam Lp and the Raman Signal $A_{sig}$ that appears in a wavelength of the second probe beam the reference probe beam Lr as a result of heterodyne interference by the phase-modulated probe beam Lp and the reference probe beam Lr.

8. The light detecting method of claim 6, wherein the sawtooth wave has a sawtooth-shaped waveform at which a fall time is shorter than a rise time.

9. The light detecting device of claim 1, wherein a modulation waveform for modulating the optical path length difference is a sawtooth-shaped waveform at which a fall time is shorter than a rise time.

10. The light detecting method of claim 6, comprising:
setting a central frequency of the phase-modulated probe beam Lp.

11. The light detecting method of claim 6, comprising:
combining the excitation beam, the phase-modulated probe beam Lp and the reference probe beam Lr and converting an optical path.

* * * * *